H. HORSFALL.
FRICTION CLUTCH.
APPLICATION FILED JUNE 5, 1908.
917,764.
Patented Apr. 13, 1909.
3 SHEETS—SHEET 1.
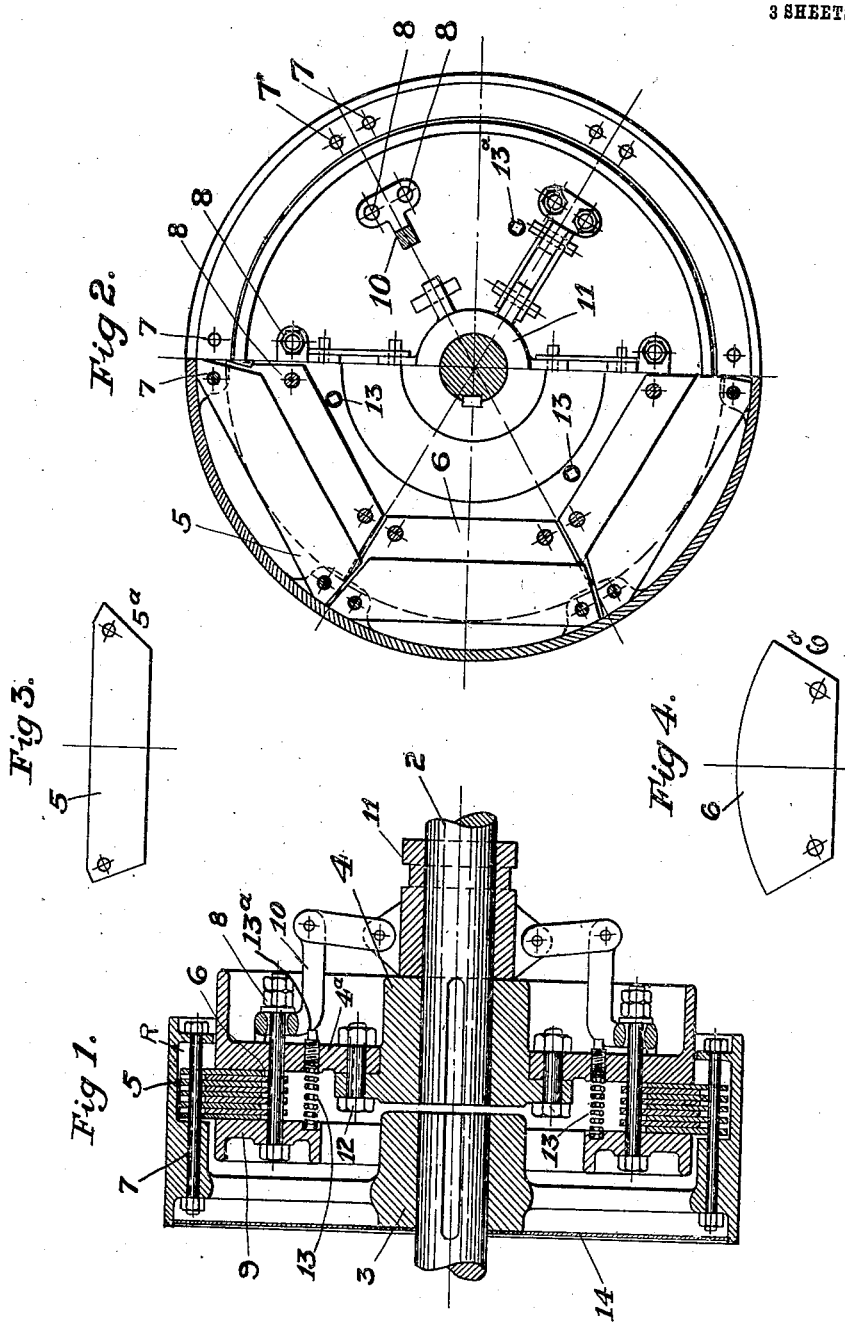
WITNESSES:
R. A. Balderson
W. W. Swartz
INVENTOR
Harold Horsfall.
BY
Bakewell, Byrnes & Parmelee
his ATTORNEYS

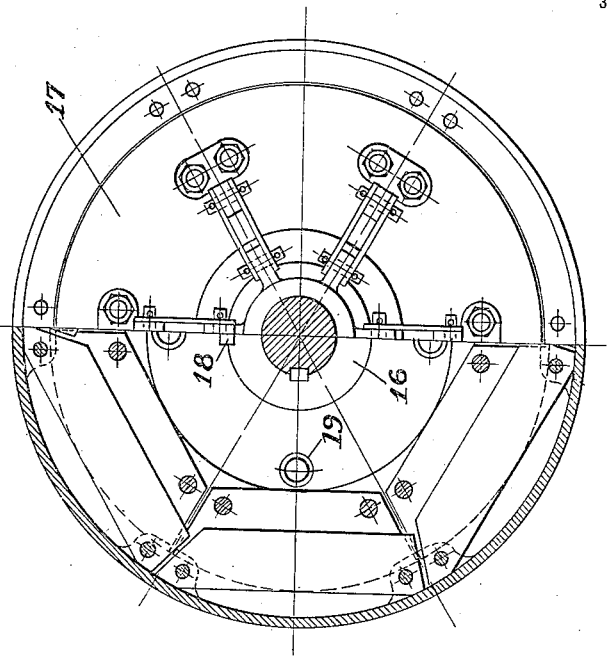
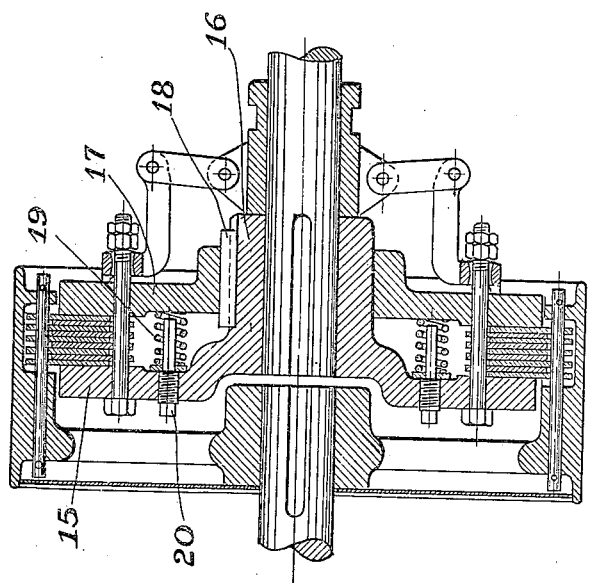

H. HORSFALL.
FRICTION CLUTCH.
APPLICATION FILED JUNE 5, 1908.

917,764.

Patented Apr. 13, 1909.
3 SHEETS—SHEET 3.

WITNESSES:
R H Balderson
W W Swartz

INVENTOR
Harold Horsfall
BY
Bakewell, Byrnes & Parmelee,
his ATTORNEYS

UNITED STATES PATENT OFFICE.

HAROLD HORSFALL, OF PITTSBURG, PENNSYLVANIA.

FRICTION-CLUTCH.

No. 917,764.  Specification of Letters Patent.  Patented April 13, 1909.

Application filed June 5, 1908. Serial No. 436,807.

*To all whom it may concern:*

Be it known that I, HAROLD HORSFALL, of Pittsburg, Allegheny county, Pennsylvania, have invented new and useful Friction-Clutches, of which the following is a full, clear, and exact description, reference being had to the accompanying drawings, forming part of this specification, in which—

Figure 12:
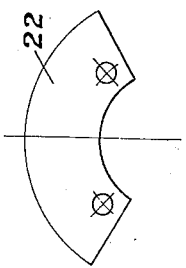
Figure 9:
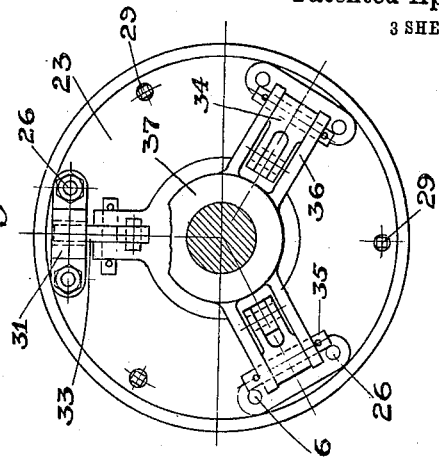
Figure 11:
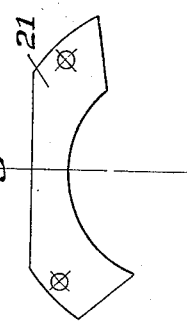
Figure 8:
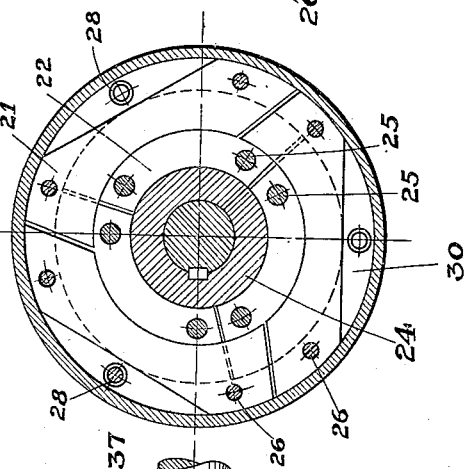
Figure 10:
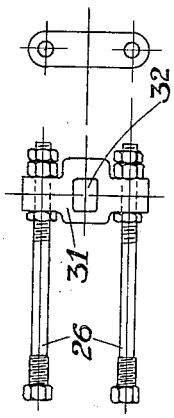
Figure 7:
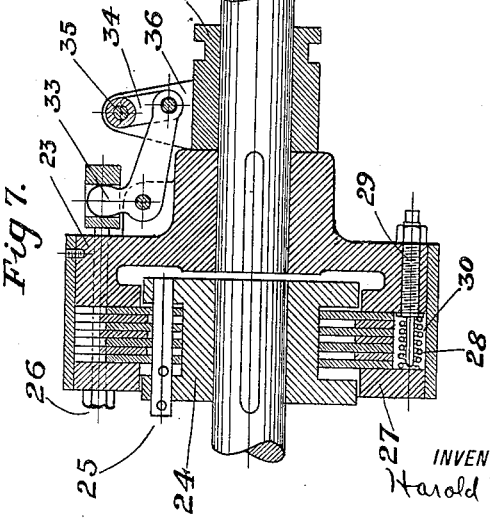

Figure 1 is a longitudinal section of one form of clutch embodying my invention; Fig. 2 is an end view of the same partly in transverse section; Figs. 3 and 4 are detail views showing the form of the clutch members; Figs. 5 and 6 are views which are respectively similar to Figs. 1 and 2, but which show a modified form of the invention; Fig. 7 is a longitudinal section showing another form of clutch; Figs. 8 and 9 are respectively a transverse section and an end view of the form of clutch shown in Fig. 7; Fig. 10 is a detail view of the securing and clamping bolts; Figs. 11 and 12 are detail views showing the form of clutch members used in the clutch shown in Figs. 7, 8 and 9.

My invention has relation to friction clutches, and more particularly to friction clutches of that type known as multiple disk clutches, in which there are a plurality of friction rings or elements arranged in two series and forming the frictional driving connection between the driving and the driven members of the clutch.

One object of my invention is to provide a clutch of this character, in which the friction elements are cheaply made from narrow cold rolled or cold drawn bars or plates, thus insuring the provision of elements all of uniform thickness and having a smooth friction surface, without the necessity for machining and other mill work, which adds greatly to the cost of production.

A further object of my invention is to provide improved means for bringing the friction elements into driving contact; to provide means of novel character for lubricating the elements, and to improve other details of the clutch, all as hereinafter described.

Referring first to the form of clutch shown on Sheet 1 of the drawings, the numeral 2 designates a divided shaft, and 3 and 4 the driving and driven members which are keyed to the respective sections of the shaft 2. Either the member 3 or the member 4 may be the driving member. In the present instance, the member 3 constitutes the driving member, being in the form of a pulley, but arranged to drive said shaft through the medium of the member 4 and the interposed clutch elements. 5 designates the clutch elements which are carried by the member 3, and 6 the clutch elements which are carried by the member 4. These elements instead of being continuous annular rings, such as have heretofore been generally used for the purpose, consist of segments, which are preferably cut or sheared or may be punched by means of dies from cold rolled bars or plates. These elements have beveled ends $5^a$ and $6^a$ so that they will fit together in the manner shown in Fig. 2, where it will be noticed that the joints $5^a$ and $6^a$ do not fall in line, the elements 5 and 6 being arranged in alternating relation to each other; that is to say, there being one of the elements 6 between each pair of the elements 5. The elements 5 are secured to the driving member 3 by means of bolts or pins 7, which extend through the internal flanges of the rim portion of the driving member. The elements 6 are secured by bolts 8, which also form the means for applying the clamping pressure to the friction elements through the clamping ring or pressure plate 9. The bolts 8 extend through the ring 9, through the series of elements 6, and through the web portion $4^a$ of the driven member 4, and their outer and projecting ends are loosely engaged by the levers 10, which are connected to the clutch sleeve 11, arranged to slide endwise on the shaft 2, and which is actuated by any suitable and well known means (not shown).

In the construction shown on Sheet 1, the rim and web portion $4^a$ of the driving member 4 is formed separately from the hub 4, and is connected thereto by bolts 12, which can be readily removed. The removal of these bolts permits the rim and web section $4^a$ to be also readily removed to permit access to the clutch elements. 13 designates separating springs which are interposed between the web $4^a$ of the driven member and the clamping ring 9, for the purpose of releasing the pressure on the friction elements when the clutch is thrown out of driving engagement. 14 is a dust guard for the member 3.

By reference to Fig. 2, it will be noted that the bolts 8 are arranged in pairs, there being one of these bolts extending through each end portion of each of the segments 6. The bolts 7 are also arranged in pairs, one bolt extending through each end portion of the other series of segments 5.

The springs 13 are preferably provided with an end bearing in the web member 4ᵃ, consisting of removable threaded plugs 13ᵃ, which also provide means for adjusting the tension of these springs. The plugs 13ᵃ can also be removed for lubricating the friction elements 5 and 6, and the recess R is the continuous annular space in the outer part of the driving member 3, for collecting the lubricant, from which the lubricant will gravitate back to the clutch elements when the driving member 3 is not in motion.

The form of clutch shown in Figs. 5 and 6, is in general similar to that shown on Sheet 1, except that the pressure plate or ring 17 is mounted loosely on the hub of the driven member 16, on which it is free to move in a longitudinal direction, but is prevented from rotating on the said hub by a key 18. In this form of clutch, the pressure plate 17 is moved endwise on the friction member 16, to bring the friction elements into driving engagement. The space 19 between the web or flange 15 of the hub 16 and the clamping plate 17 also constitutes a lubricant chamber into which graphite or other lubricant may be introduced by means of the removable plugs 20, which correspond to the plugs 13ᵃ of the form of clutch first described.

The form of clutch shown on Sheet 3 is more particularly adapted for clutches of small sizes, the segments 21 and 22 of the clutch elements being of less number and of slightly modified form, as clearly shown in Figs. 8, 11 and 12. In this form of clutch, 23 is the driving member and 24 the driven member (although either 23 or 24 may be the driving member). 25 are the bolts or pins which secure the inner series of segments 22, said bolts or pins being seated in the end flanges of the member 24. 26 are the bolts or pins which secure the outer series of segments 21. These bolts or pins extend through the rim portion of the driving member 23, and also through the clamping ring 27. 28 are the separating springs, which are placed between the friction elements 21 and 22 and the outer shell, and 29 the removable threaded plugs which form an end bearing for said springs, and which may also be removed to permit of the introduction of lubricant to the chamber 30, in which the springs are seated, and which surrounds the two series of friction elements. The bolts 25 and 26 are arranged in pairs, as in the other construction described.

Fig. 10 shows a detail view of one pair of the outer bolts 26. These bolts are connected at their outer projecting ends by a cross head or compensating bar 31, having an opening 32 therein which is engaged by a lever 33, connected by a link 34 with a pin 35 carried on a projecting arm or lug 36 of the removable sleeve 37.

It will be seen that the levers 33, by means of the compensating bar 31 and the bolts 26, which are screwed into the clamping ring 27, secure a positive release of the clamping bolts 26 and the clamping ring 27 which is aided by the action of the separating springs 28, while the nuts shown on the clamping bolts 26 are used for adjusting any wear on the friction elements 21 and 22, and the compensating bar 31 will automatically adjust any difference of pressure in the two bolts 26 and at the same time secure finer adjustment.

It will be noticed that the arrangement of the levers 33 and links 34 is such that the centrifugal action of rotation will tend to force the levers 33 in a direction to release the clamping action of the bolts 26, when the clutch is disengaged.

Referring to Fig. 8, it will be noted that there are three of the segments 21 and three of the segments 22, shown in the same plane. The number may, however, be reduced to two of each, or may be increased to any higher number, the number of pairs of bolts being, of course, reduced or increased correspondingly.

The advantages of my invention will be apparent to those skilled in the art. Heretofore, the manufacture of friction rings or elements has been a matter of considerable difficulty and expense, on account of the bar or plate from which they are made being necessarily as wide as the diameter of the friction ring and owing to the necessity for machining the surfaces of the elements to give them the proper surface and make them of uniform thickness. By forming these elements from cold rolled or cold drawn plates or bars, they are all of uniform thickness and have bright smooth surfaces, particularly adapted to the purpose for which they are required. They can thus be formed at a comparatively small expense and with less waste of material, and can be readily assembled with the clutch. It will also be noted that I avoid the use of keys for driving the friction elements, and make use of the bolts for this purpose which actuate the pressure plates or rings, and which also secure the sections of the friction elements in place. It will also be noticed that the use of two bolts to one lever doubles the sensitiveness of the nuts with regard to adjustment of the pressure applied to the friction elements over what would be the case if only one bolt passed through each lever, and also that the pressure on one bolt balances the pressure on the other. The arrangement of the bolts provides means for the positive release of the clamping ring and clamping bolts, which is assisted by the action of the releasing springs.

It will be apparent that various modifications may be made in my invention within the scope of the appended claims by those skilled in the art, since the driven and driving elements may be variously constructed and arranged; a continuous instead of a divided shaft may be employed, and various other changes may be made. The arrangement may be used for driving pulleys, rope sheaves, spur gear or any other transmitting appliances, and the driving and driven members which are both keyed fast to the shafts may be split or in halves to facilitate the mounting of these parts on the shafts or shaft.

In the drawings, the friction elements are, for the sake of clearness, shown exaggerated in thickness.

I claim:

1. In a friction clutch, a shaft, a pulley member mounted thereon and having internal flanges on its rim, a plurality of friction elements interposed between the said flanges, each of said elements being composed of a plurality of separate pieces or segments, and pins or bolts arranged in pairs and extending through said flanges and also passing through said segments and securing them to the pulley member; substantially as described.

2. In a friction clutch, a driving member, a driven member, and a series of friction elements carried by each of said members, the said elements being arranged in alternating relation and consisting each of separate independent pieces or segments placed radially or tangentially around the shaft, the segments in the same plane having adjacent ends, substantially as described.

3. In a friction clutch of the character described, the combination with a driving member and a driven member, of a series of friction elements carried by each of said members, each of said elements consisting of a series of short independent separate segments placed radially or tangentially about the shaft, the segments in the same plane having adjacent ends, substantially as described.

4. In a friction clutch of the character described, the combination with a driving member and a driven member, of a series of friction elements carried by each of said members, each of said elements being composed of a plurality of separate independent segments, and bolts or pins securing said elements to the respective members, said bolts or pins being arranged in pairs, substantially as described.

5. In a friction clutch, the combination of a driving element and a driven element, of two series of interposed friction elements, each element consisting of a plurality of separate segments, bolts or pins connecting one series of such elements to the driving member, and bolts connecting the other series of the elements to the driven member, and means for applying clamping pressure to said elements through one set of such bolts or pins, substantially as described.

6. In a friction clutch, a shaft having a member mounted thereon consisting of a hub portion and a flange portion, a clamping member mounted on said hub portion, a plurality of friction elements consisting each of a plurality of separate segments interposed between the clamping member and the said flange portion, and clamping bolts arranged in pairs parallel to the axis of the shaft, said bolts engaging the clamping member and passing through said segments; substantially as described.

7. In a friction clutch, a driving member, a driven member, and a series of friction elements carried by each of said members, each of said elements consisting of a plurality of separate segments, and bolts or pins connecting said segments to the respective members, said bolts or pins being arranged in pairs, and means for applying clamping pressure to said elements through one series of pairs of said bolts or pins, substantially as described.

8. In a friction clutch, the combination with a driving element and a driven element, of a series of friction elements each consisting of separate pieces or segments interposed between the driving and driven elements, means for applying clamping pressure to the friction elements, and release springs for said elements, substantially as described.

9. In a friction clutch, the combination of a driving element, a driven element, a series of friction elements each consisting of separate pieces or segments interposed between the driving and driven elements, a clamping ring or plate, means for applying clamping pressure thereto, springs arranged to act upon the clamping ring of the plate in the reverse direction to the pressure-applying means, and means for adjusting the tension of the springs, substantially as described.

10. In a friction clutch, the combination of a driving member and a driven member, a series of friction elements each consisting of separate pieces or segments interposed between said members, a clamping ring or plate carried by one of said members, means for applying clamping pressure to said plate, springs acting upon said plate in opposition to the means for applying pressure, and removable plugs forming bearings for one end of said springs, said springs being placed in a lubricant chamber adjacent to the friction elements, substantially as described.

11. In a friction clutch, the combination with driving and driven members, interposed friction elements, and a clamping ring or plate for said elements, of means for positively actuating the clamping ring, consisting of bolts engaging tne clamping rings and arranged in pairs, and a cross-head or equalizing bar connecting the bolts of each pair of bolts, and clamping nuts for adjusting the cross-bars to compensate for wear of the friction elements, substantially as described.

12. In a friction clutch, a plurality of friction elements consisting each of a plurality of separate segments arranged about the clutch shaft, said segments having each a straight edge, a clamping member for the segments, and springs seated in the spaces provided by the straight edges of the segments and acting in a direction parallel to the shaft to release the clamping member; substantially as described.

13. In a friction clutch, a shaft, a hub member mounted thereon and carrying a flange, a plurality of friction elements, a clamping member, arranged to act on said elements, said elements consisting each of a plurality of separate segments, and bolts or pins engaging said clamping member and extending through the said elements and through the said flange, said bolts or pins being arranged in pairs at the end portions of the segments; substantially as described.

In testimony whereof, I have hereunto set my hand.

HAROLD HORSFALL.

Witnesses:
R. D. LITTLE,
H. M. CORWIN.